(12) United States Patent
Jeon et al.

(10) Patent No.: US 12,494,153 B2
(45) Date of Patent: Dec. 9, 2025

(54) TIMING CONTROLLER, DRIVING METHOD THEREOF, AND DISPLAY APPARATUS INCLUDING TIMING CONTROLLER

(71) Applicant: LX Semicon Co., Ltd., Daejeon (KR)

(72) Inventors: Jae Woo Jeon, Daejeon (KR); Hyun Mo Yang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 610 days.

(21) Appl. No.: 17/950,996

(22) Filed: Sep. 22, 2022

(65) Prior Publication Data
US 2023/0117376 A1    Apr. 20, 2023

(30) Foreign Application Priority Data

Oct. 19, 2021    (KR) .................. 10-2021-0139203

(51) Int. Cl.
*G09G 3/20*    (2006.01)

(52) U.S. Cl.
CPC ....... *G09G 3/2092* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 2006/0026476 A1* | 2/2006 | Nishida | G01R 31/31858 714/730 |
| 2009/0058482 A1* | 3/2009 | Kim | H03K 5/1565 327/175 |
| 2009/0059713 A1* | 3/2009 | Ijitsu | G11C 29/14 365/233.1 |
| 2010/0088562 A1* | 4/2010 | Grise | G01R 31/318541 714/E11.155 |
| 2015/0338456 A1* | 11/2015 | Seo | G11C 29/50012 327/158 |

FOREIGN PATENT DOCUMENTS

| | | |
|---|---|---|
| KR | 10-0557517 A | 3/2006 |
| KR | 2008-0064367 A | 7/2008 |
| KR | 10-2248139 A | 5/2021 |
| KR | 10-2260815 A | 6/2021 |

* cited by examiner

*Primary Examiner* — Krishna P Neupane
(74) *Attorney, Agent, or Firm* — POLSINELLI PC

(57) ABSTRACT

A timing controller generates a second clock by using a first clock, generates a test pulse by using the second clock, and generates a plurality of test clocks by latching the test pulse. The timing controller determines whether the clock signal is normally generated, by using the number of a plurality of rising edges included in a cycle of the test pulse and the number of a plurality of falling edges included in the cycle of the test pulse. The plurality of rising edges are rising edges of the plurality of test clocks, and the plurality of falling edges are falling edges of the plurality of test clocks.

19 Claims, 6 Drawing Sheets

TIMING CONTROLLER, DRIVING METHOD THEREOF, AND DISPLAY APPARATUS INCLUDING TIMING CONTROLLER

BACKGROUND

1. Technical Field

Various embodiments generally relate to a timing controller, a method for driving the timing controller, a display apparatus including the timing controller and a method for driving the display apparatus.

2. Related Art

In general, a liquid crystal display panel (an LCD panel) is widely used in a display apparatus for realizing a flat panel display. Such a display apparatus includes a timing controller, a source driver and a display panel. The display panel is being developed to realize high resolution. In order to support high resolution of the display panel, the timing controller and the source driver need to be configured to communicate data through a high-speed interface.

In order for the high-speed interface between the timing controller and the source driver, a protocol based on a delay-locked loop (DLL) or a phase-locked loop (PLL) may be used. The protocol based on the delay-locked loop may be understood as having a format in which the source driver can restore a received packet on the basis of the delay-locked loop, and the protocol based on the phase-locked loop may be understood as having a format in which the source driver can restore a received packet on the basis of the phase-locked loop.

In the conventional art, the timing controller and a memory are manufactured as a multi-chip package (MCP) by being stacked on the same substrate and combined into one package. Accordingly, there is a problem in that a normal operation of an IP (intellectual property) of the timing controller cannot be checked before the timing controller and the memory are packaged.

In addition, there is a problem in that, even when the IP of the timing controller is abnormal, a packaging process is performed and thus a defective chip is manufactured.

SUMMARY

Various embodiments are directed to a timing controller, a method for driving the timing controller, a display apparatus including the timing controller and a method for driving the display apparatus, capable of determining a normal operation of an IP of the timing controller before an MCP process.

Also, various embodiments are directed to a timing controller, a method for driving the timing controller, a display apparatus including the timing controller and a method for driving the display apparatus, capable of identifying an abnormal timing controller before a packaging process not to performing the packaging process for the abnormal timing controller, thereby reducing the packaging cost.

In an embodiment, a timing controller may be configured to generate a clock signal by using an external first clock, wherein the timing controller generates a second clock by using the first clock, generates a test pulse by using the second clock, and generates a plurality of test clocks by latching the test pulse, wherein the timing controller determines whether the clock signal is normally generated, by using the number of a plurality of rising edges included in a cycle of the test pulse and the number of a plurality of falling edges included in the cycle of the test pulse, and wherein the plurality of rising edges are rising edges of the plurality of test clocks, and the plurality of falling edges are falling edges of the plurality of test clocks.

Accordingly, the timing controller according to the embodiment provides an effect of being capable of determining a normal operation of the timing controller before an MCP process. Also, the timing controller according to the embodiment provides an effect of being capable of identifying an abnormal timing controller before a packaging process not to perform the packaging process for the abnormal timing controller, thereby reducing the packaging cost.

In an embodiment, a method for driving a timing controller configured to generate a clock signal by using an external first clock may include: generating a second clock by using the first clock, and generating a test pulse by using the second clock; generating a plurality of test clocks by latching the test pulse; and determining whether the clock signal is normally generated, by using the number of a plurality of rising edges included in a cycle of the test pulse and the number of a plurality of falling edges included in the cycle of the test pulse, wherein the plurality of rising edges are rising edges of the plurality of test clocks, and the plurality of falling edges are falling edges of the plurality of test clocks.

Accordingly, the method for driving a timing controller according to the embodiment provides an effect of being capable of determining a normal operation of the timing controller before an MCP process. Also, the method for driving a timing controller according to the embodiment provides an effect of being capable of identifying an abnormal timing controller before a packaging process not to perform the packaging process for the abnormal timing controller, thereby reducing the packaging cost.

In an embodiment, a display apparatus may include a timing controller configured to generate a clock signal by using an external first clock, wherein the timing controller generates a second clock by using the first clock, generates a test pulse by using the second clock, and generates a plurality of test clocks by latching the test pulse, wherein the timing controller determines whether the clock signal is normally generated, by using the number of a plurality of rising edges included in a cycle of the test pulse and the number of a plurality of falling edges included in the cycle of the test pulse, and wherein the plurality of rising edges are rising edges of the plurality of test clocks, and the plurality of falling edges are falling edges of the plurality of test clocks.

Accordingly, the display apparatus according to the embodiment provides an effect of being capable of determining a normal operation of a timing controller before an MCP process. Also, the display apparatus according to the embodiment provides an effect of being capable of identifying an abnormal timing controller before a packaging process not to perform the packaging process for the abnormal timing controller, thereby reducing the packaging cost.

In an embodiment, a timing controller may be configured to generate a clock signal, wherein the timing controller generates a test pulse by using an external clock, and generates a test clock by using the test pulse, and wherein the timing controller determines whether the clock signal is normally generated, by using a cycle of the test pulse and an edge of the test clock.

Accordingly, the method for driving a display apparatus according to the embodiment provides an effect of being capable of determining a normal operation of a timing controller before an MCP process. Also, the method for driving a display apparatus according to the embodiment provides an effect of being capable of identifying an abnormal timing controller before a packaging process not to perform the packaging process for the abnormal timing controller, thereby reducing the packaging cost.

The timing controller, the method for driving a timing controller, the display apparatus including a timing controller and the method for driving a display apparatus according to the embodiments provide an effect of being capable of determining a normal operation of a timing controller before an MCP process.

Also, the timing controller, the method for driving a timing controller, the display apparatus including a timing controller and the method for driving a display apparatus according to the embodiments provide an effect of being capable of identifying an abnormal timing controller before a packaging process not to perform the packaging process for the abnormal timing controller, thereby reducing the packaging cost.

DETAILED DESCRIPTION

Description will now be given in detail according to exemplary embodiments disclosed herein with reference to the accompanying drawings. The same or similar components may be provided with the same or similar reference numbers, and repeated description thereof will be omitted.

Hereinafter, a display apparatus in accordance with an embodiment will be described with reference to FIG. 1.

Figure 1:
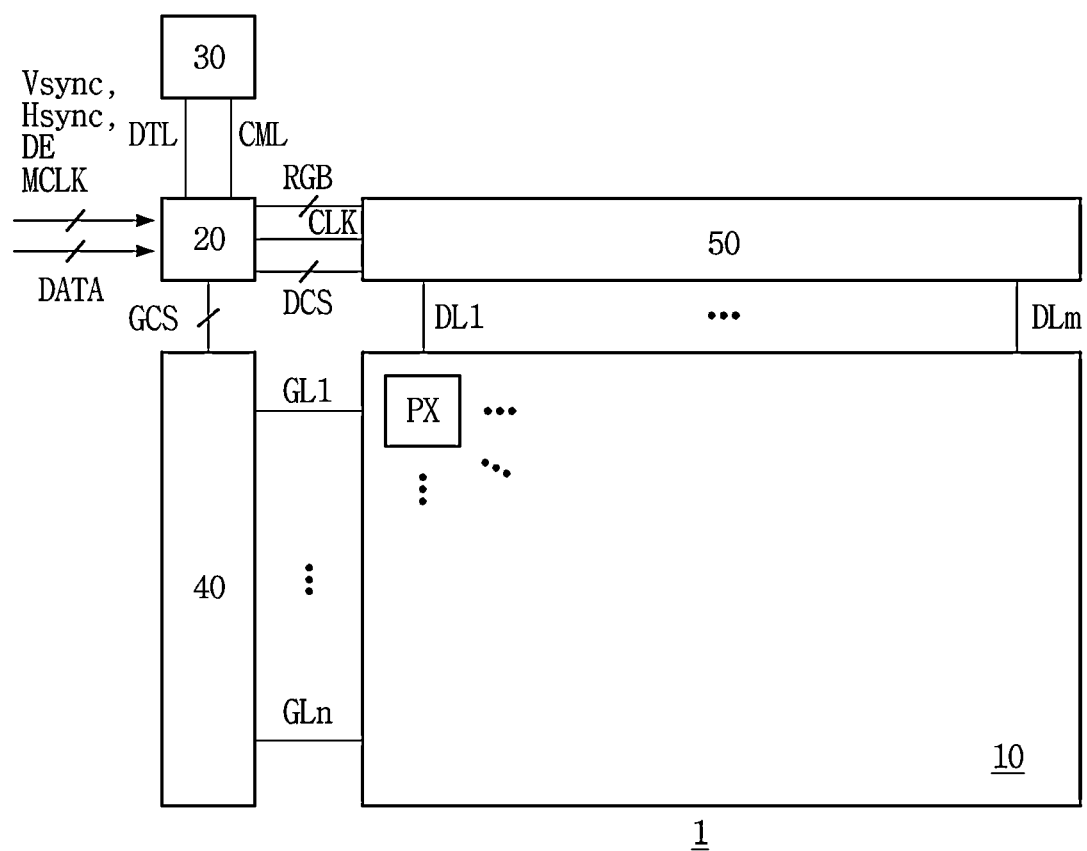
FIG. 1 is a diagram illustrating the configuration of a display apparatus in accordance with an embodiment.

FIG. 1 is a diagram illustrating a display apparatus in accordance with an embodiment.

A display apparatus 1 in accordance with an embodiment may include a panel 10, a timing controller 20, a memory 30, a gate driver 40, a data driver 50 and a power supply.

The panel 10 includes a plurality of gate lines GL1 to GLn and a plurality of data lines DL1 to DLm which are arranged to intersect with each other and define a plurality of pixel regions, and a plurality of pixels PX. The plurality of gate lines GL1 to GLn may be arranged in a horizontal direction, and the plurality of data lines DL1 to DLm may be arranged in a vertical direction. However, the embodiment is not limited thereto. The panel 10 may be a liquid crystal display (LCD) panel. The panel 10 may display an image by light emission of pixels PX to which corresponding gate lines and corresponding data lines among the plurality of gate lines GL1 to GLn and the plurality of data lines DL1 to DLm are connected.

Each of the plurality of pixels PX may be configured by red, green, blue and white subpixels. In an embodiment, each subpixel may be repeatedly formed in a row direction or may be formed in a 2*2 matrix form. The red, green, blue and white subpixels may be formed at the same area ratio, but may be formed at different area ratios.

The timing controller 20 may receive timing signals including a vertical synchronization signal Vsync, a horizontal synchronization signal Hsync, a data enable signal DE and a clock MCLK, together with image data (hereinafter, referred to as data) DATA inputted from an external host (not illustrated). The timing controller 20 may generate a clock signal CLK using the clock MCLK. The timing controller 20 may generate an internal clock using the clock MCLK. The timing controller 20 may generate a test pulse using the internal clock. The timing controller 20 may generate a plurality of test clocks by latching the test pulse according to a predetermined phase. For example, the timing controller 20 may generate a plurality of test clocks as DLL clocks by latching the test pulse. The timing controller 20 may sample each of the plurality of test clocks as a first level or a second level during the high level period of the test pulse. The timing controller 20 may determine whether the generation of the clock signal CLK is normal, according to a sampling result. A detailed method for the timing controller 20 to determine that the generated clock signal CLK is normal will be described later.

The timing controller 20 may convert the data DATA in conformity with a data signal format used by the data driver 50 and output converted image data RGB. In order to control the gate driver 40 and the data driver 50, the timing controller 20 may receive the timing signals such as the vertical synchronization signal Vsync, the horizontal synchronization signal Hsync, the data enable signal DE and the clock MCLK, may generate various control signals, and may output the generated control signals to the data driver 50 and the gate driver 40. For example, in order to control the gate driver 40, the timing controller 20 may generate a gate control signal GCS including a gate start pulse, a gate shift clock, a gate output enable signal, etc. The gate start pulse controls the operation start timing of gate driver ICs which configure the gate driver 40. The gate shift clock, as a clock signal which is inputted in common to the gate driver ICs, controls the shift timing of a scan signal (a gate pulse). The gate output enable signal specifies the timing information of the gate driver ICs.

Further, in order to control the data driver 50, the timing controller 20 generates a data control signal DCS including a source start pulse, a source sampling clock, a source output enable signal, etc. The source start pulse controls the data sampling start timing of source driver ICs which configure the data driver 50. The source sampling clock is a clock signal which controls the sampling timing of data in each of the source driver ICs. The source output enable signal controls the output timing of the data driver 50. As the case may be, when the image data RGB inputted to the data driver 50 is transmitted according to the mini LVDS (low voltage differential signaling) interface standard, the source start pulse and the source sampling clock may be omitted, but the embodiment is not limited thereto.

The timing controller 20 may generate the clock signal CLK using the clock MCLK. For example, the timing controller 20 may include a clock divider, and may generate the clock signal CLK by reducing the frequency of the clock MCLK.

The timing controller 20 may write the data DATA to the memory 30 through a data line DTL. The timing controller 20 may read the written data DATA through the data line DTL. In order to compensate for a delay time occurring between the timing controller 20 and the memory 30, the timing controller 20 generates the clock signal CLK and latches the clock signal CLK with a predetermined phase difference according to an operating frequency of the memory 30. A detailed method for the timing controller 20 to compensate for a delay time will be described later.

The data DATA may be written to the memory 30 through the data line DTL according to a memory control signal MCS. The data DATA written to the memory 30 may be read through the data line DTL according to the memory control signal MCS. The memory 30 may be a DDR SDRAM (double data rate synchronous dynamic random access memory), but the embodiment is not limited thereto.

The gate driver 40 includes a shift register which sequentially generates a scan signal, that is, a gate signal of an enable level, according to the gate control signal GCS of the timing controller 20. The gate driver 40 may generate the scan signal of the enable level so that a corresponding pixel PX among the plurality of pixels PX emits light. The gate driver 40 may be disposed on one side of the panel 10, for example, the left side of the panel 10. However, the embodiment is not limited thereto, and the gate driver 40 may be disposed on the left and right sides of the panel 10 to face each other. The gate driver 40 may include a plurality of gate driver integrated circuits (ICs) (not illustrated). The gate driver 40 may be implemented in the form of a tape carrier package in which the gate driver ICs are mounted. However, the embodiment is not limited thereto, and the gate driver ICs may be directly mounted to the panel 10.

The data driver 50 converts an image data signal of the timing controller 20 into an analog source signal, and outputs the analog source signal to the panel 10. In detail, the data driver 50 may output the analog source signal to each of the plurality of data lines DL1 to DLm in response to the data control signal DCS of the timing controller 20. The data driver 50 may be disposed on one side of the panel 10, for example, the top side of the panel 10. However, the embodiment is not limited thereto, and the data driver 50 may be disposed on one side and the other side, for example, both the top and bottom sides, of the panel 10 to face each other. The data driver 50 may include a plurality of source driver ICs (not illustrated) which convert the image data RGB transmitted from the timing controller 20 into an analog source signal and output the analog source signal to the panel 10.

The data driver 50 may be implemented in the form of a tape carrier package in which the source driver ICs are mounted, but the embodiment is not limited thereto.

Hereinafter, a method of compensating for a delay time occurring between the memory and the timing controller according to the embodiment will be described with reference to FIGS. 2 and 3.

Figure 2:
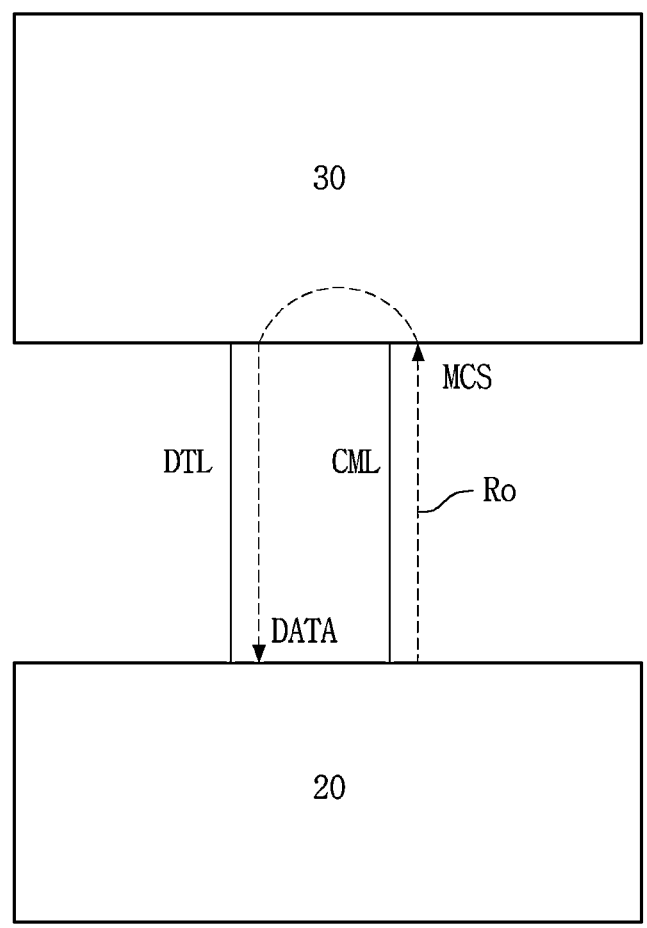
FIG. 2 is a diagram illustrating paths between a timing controller and a memory in accordance with the embodiment.

FIG. 2 is a diagram illustrating signal paths formed between a timing controller and a memory in accordance with the embodiment.

Figure 3:
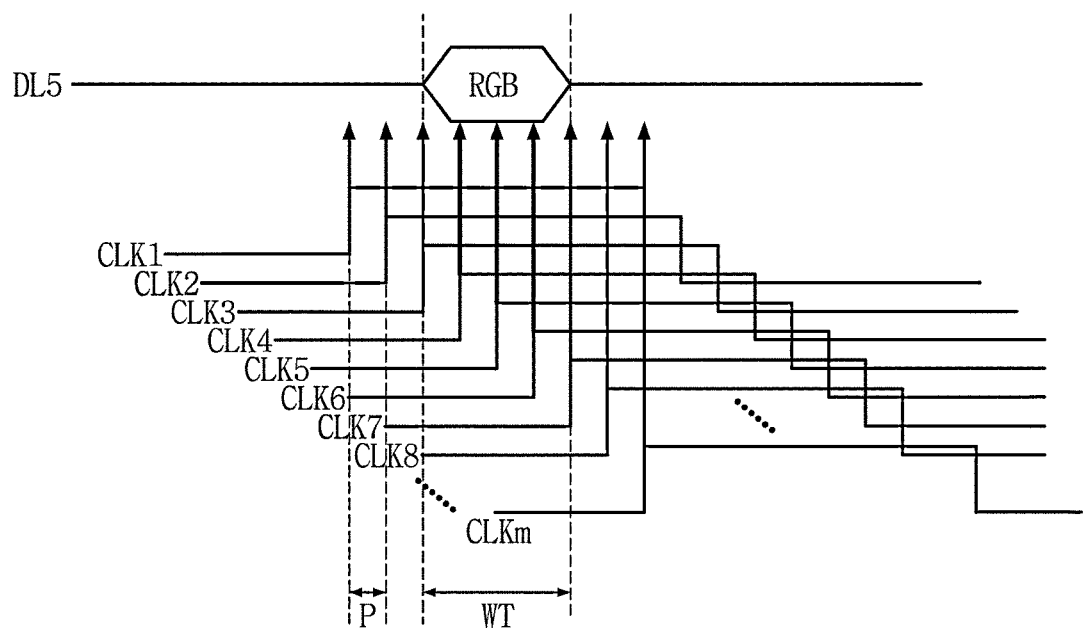
FIG. 3 is a diagram illustrating a window time of image data transmitted from the memory in accordance with the embodiment.

FIG. 3 is a diagram illustrating image data corresponding to a clock in accordance with the embodiment.

Referring to FIG. 2, the timing controller 20 may generate the memory control signal MCS such that the data DATA is written to the memory 30 and the written data DATA is read from the memory 30. In order to write and read the image data RGB to and from the memory 30, the timing controller 20 may reset or calibrate a clock at an initial operation of the memory 30. The timing controller 20 may transmit the memory control signal MCS through a command line CML. The timing controller 20 may write the data DATA to the memory 30 and read the written data DATA from the memory 30 according to the memory control signal MCS. The memory control signal MCS may include DDR SDRAM standard commands including CK, CKN, CKE, RAS, CAS, WE, ADDRESS and Bank Address. A data bus and a data bus strobe may also be transmitted through the data line DTL.

A path Ro through which the memory control signal MCS is transmitted and the data DATA is transmitted to the timing controller 20 may be formed. From a time point at which the memory control signal MCS is transmitted to a time point at which the data DATA is transmitted to the timing controller 20, a delay time during which a signal moves may occur according to the path Ro.

The timing controller 20 may set a valid window time WT of the image data RGB according to the operating frequency of the memory 30 and the number of bits of the data line DL. The timing controller 20 may set the window time WT in consideration of the operation characteristics of the memory 30 and the skew of the data line (dq of DDR) of the memory 30. The timing controller 20 may set a clock latch interval P so that the image data RGB is stably applied to a corresponding data line DL during the window time WT. The timing controller 20 may latch the clock signal CLK as a plurality of clocks CLK1 to CLKm according to the clock latch interval P. The plurality of latched clocks CLK1 to CLKm may correspond to a plurality of data lines DL1 to DLm.

For example, referring to FIG. 3, when the operating frequency of the memory 30 is 200 MHz and the number of bits of the data line DL is 16 or 32, the timing controller 20 may set the window time WT to 1 ns. When the image data RGB corresponding to a fifth data line DL5 among the plurality of data lines DL1 to DLm is transmitted, in order to stably write the image data RGB to the pixel PX, the image data RGB should be written in correspondence to three clocks CLK4, CLK5 and CLK6. Accordingly, the timing controller 20 may set the clock latch interval P to 0.3125 ns so that the image data RGB is stably latched during the window time WT. The timing controller 20 may latch the clock signal CLK as 16 clocks CLK1 to CLK16 according to the clock latch interval P.

Accordingly, the timing controller 20 may compensate for a delay time occurring in the path Ro, by latching the clock signal CLK as the 16 clocks CLK1 to CLK16.

Hereinafter, a detailed method for the timing controller in accordance with the embodiment to determine whether a generated clock is normal will be described in detail with reference to FIGS. 4 and 5.

Figure 4:
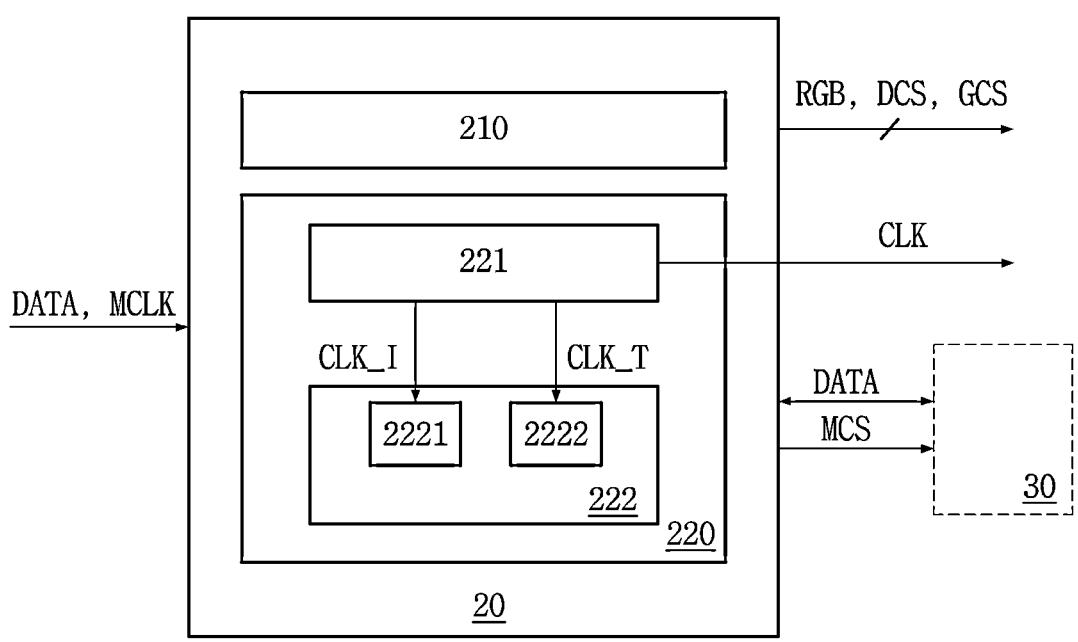
FIG. 4 is a block diagram illustrating the configuration of the timing controller in accordance with the embodiment.

FIG. 4 is a block diagram illustrating the configuration of the timing controller in accordance with the embodiment.

Figure 5:
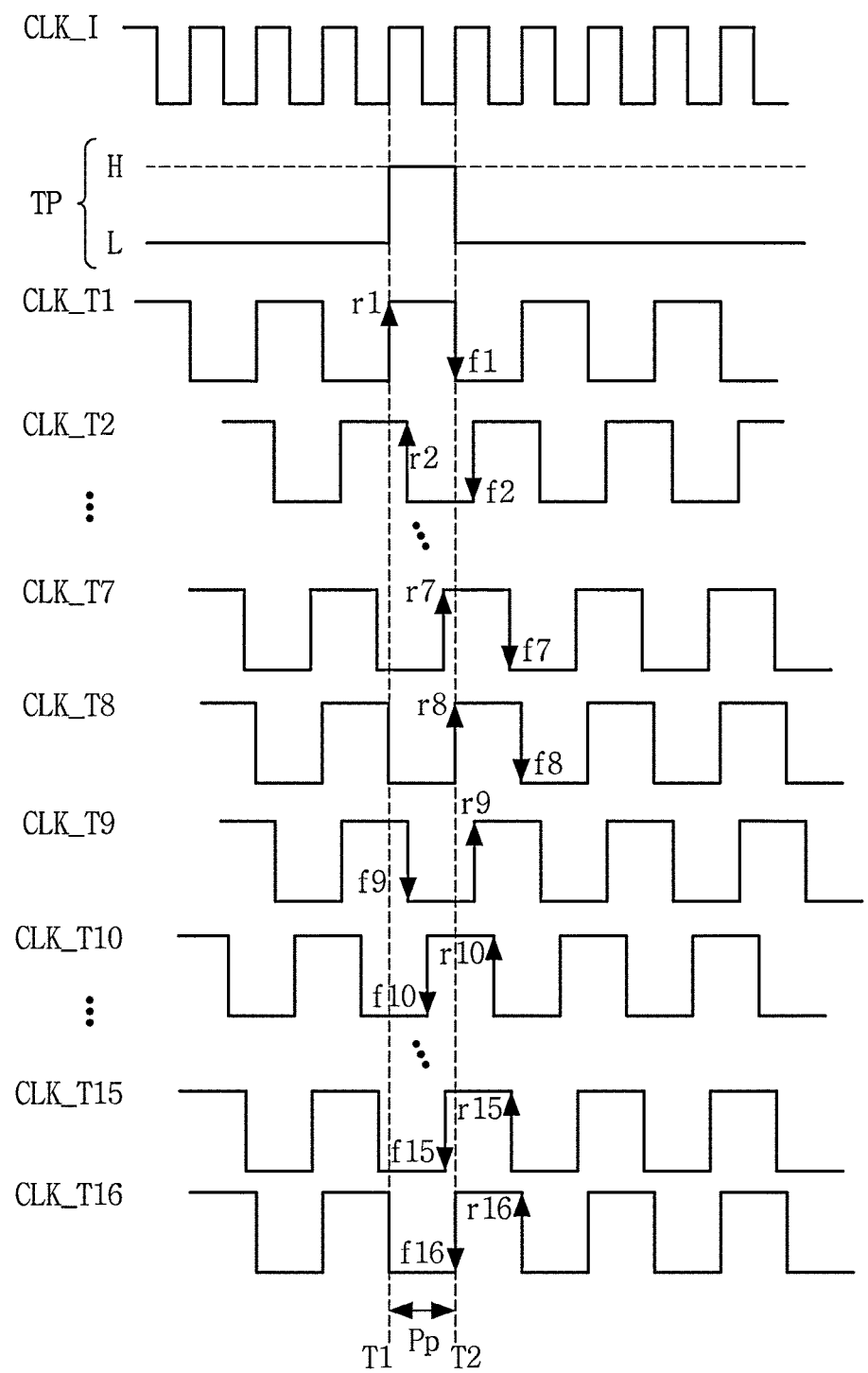
FIG. 5 is a timing diagram illustrating operation timing of a memory controller in accordance with the embodiment.

FIG. 5 is a timing diagram illustrating operation timing of a memory controller in accordance with the embodiment.

Referring to FIG. 4, the timing controller 20 may include a data processor 210 and a memory controller 220. However, the configuration of the timing controller 20 is not limited thereto, and various components for controlling the panel 10 may be additionally included.

The data processor 210 may generate the image data RGB by using the data DATA.

The memory controller 220 may generate the memory control signal MCS so that the data DATA is written to the memory 30 and the written data DATA is read through the data line DTL. The memory controller 220 may transmit the memory control signal MCS to the memory 30. The memory control signal MCS may include a write command and a read command. The memory controller 220 may readjust the memory 30 by correcting the data line skew of the memory 30 or resetting the memory 30.

The memory controller 220 may generate an internal clock CLK_I using the clock MCLK. The memory controller 220 may generate a test pulse TP using the clock MCLK. The memory controller 220 may generate a plurality of test clock CLK_T by latching the clock MCLK. For example, the memory controller 220 may generate the plurality of test clocks CLK_T as DLL clocks by latching the clock MCLK.

The memory controller 220 may set a period corresponding to a predetermined level in the test pulse TP.

Among the plurality of test clocks CLK_T, the memory controller 220 may recognize a rising edge included in the set period as a first level and recognize a rising edge not included in the set period as a second level. Among the plurality of test clocks CLK_T, the memory controller 220 may recognize a falling edge included in the set period as a first level and recognize a falling edge not included in the set period as a second level. The memory controller 220 may determine whether the generation operation of the clock signal CLK is normal, by using the number of rising edges and the number of falling edges corresponding to the first level and the number of rising edges and the number of falling edges corresponding to the second level.

Referring to FIGS. 4 and 5, the memory controller 220 may include a clock generation circuit 221 and a link circuit 222.

The clock generation circuit 221 may generate the clock signal CLK using the internal clock CLK_I. The clock generation circuit 221 may measure the cycle of the internal clock CLK_I. The clock generation circuit 221 may set a portion of the cycle of the internal clock CLK_I as a phase difference. The clock generation circuit 221 may generate 16 test clocks CLK_T by latching the clock signal CLK according to the set phase difference.

For example, the clock generation circuit 221 may measure the cycle of the internal clock CLK_I between a first time point T1 and a second time point T2. The clock generation circuit 221 may set 1/16 of the cycle of the internal clock CLK_I as a phase difference. The clock generation circuit 221 may generate a first test clock CLK_T1 to a sixteenth test clock CLK_T16 by latching the clock signal CLK according to the phase difference. The first test clock CLK_T1 has the same phase as the test pulse TP. The clock generation circuit 221 may be implemented using a delay-locked loop (DLL) circuit.

The link circuit 222 may generate the memory control signal MCS. In a write operation, the link circuit 222 may generate the memory control signal MCS so that the data DATA is written to the memory 30. In a read operation, the link circuit 222 may generate the memory control signal MCS so that the data DATA written to the memory 30 is read. The link circuit 222 may transmit the memory control signal MCS through the command line CML. The link circuit 222 may generate the test pulse TP using the internal clock CLK_I. The link circuit 222 may sample each of the plurality of test clocks CLK_T as the first level or the second level during the high level period of the test pulse TP. The timing controller 20 may determine whether the generation of the clock signal CLK is normal, according to a sampling result.

The link circuit 222 may include an internal clock generator 2221 and a tester 2222.

The internal clock generator 2221 may generate the internal clock CLK_I by dividing the clock MCLK by two.

The tester 2222 may generate the test pulse TP using the internal clock CLK_I. The tester 2222 may generate the test pulse TP corresponding to the cycle of the internal clock CLK_I. For example, the tester 2222 may measure the cycle of the internal clock CLK_I between the first time point T1 and the second time point T2, and may generate the test pulse TP corresponding to the period between the first time point T1 and the second time point T2. The test pulse TP may have the magnitude of a high level H between the first time point T1 and the second time point T2. The test pulse TP may have the magnitude of a low level L at a time other than between the first time point T1 and the second time point T2.

The tester 2222 may recognize a rising edge included in a high level period Pp corresponding to the high level H of the test pulse TP among the first test clock CLK_T1 to the sixteenth test clock CLK_T16, as the first level. The high level period Pp is a time between the first time point T1 and the second time point T2. The tester 2222 may recognize a rising edge not included in the high level period Pp among the first test clock CLK_T1 to the sixteenth test clock CLK_T16, as the second level. The tester 2222 may recognize a falling edge included in the high level period Pp among the first test clock CLK_T1 to the sixteenth test clock CLK_T16, as the first level. The tester 2222 may recognize a falling edge not included in the high level period Pp among the first test clock CLK_T1 to the sixteenth test clock CLK_T16, as the second level. The tester 2222 may generate a first count number by adding the number of rising edges corresponding to the first level and the number of falling edges corresponding to the first level. The tester 2222 may generate a second count number by adding the number of rising edges corresponding to the second level and the number of falling edges corresponding to the second level.

The tester 2222 may compare the number of rising edges corresponding to the first level and the number of falling edges corresponding to the first level. The tester 2222 may compare the number of rising edges corresponding to the second level and the number of falling edges corresponding to the second level. The tester 2222 may compare the first count number and the second count number. The tester 2222 may compare the sum of the first count number and the second count number with a preset threshold.

When the number of rising edges corresponding to the first level and the number of falling edges corresponding to the first level are the same as each other, the number of rising edges corresponding to the second level and the number of falling edges corresponding to the second level are the same as each other, the first count number and the second count number are the same as each other and the sum of the first count number and the second count number is the same as the preset threshold, the tester 2222 may determine that the operation of the clock generation circuit 221 is normal.

For example, the tester 2222 may sample eight rising edges r1 to r8 included in the high level period Pp. The tester 2222 may recognize the eight rising edges r1 to r8 as the first level. The tester 2222 may sample eight falling edges f1 to f8 not included in the high level period Pp. The tester 2222 may recognize the eight falling edges f1 to f8 as the second level. When the number of rising edges having the first level and the number of falling edges having the first level are the same as each other as eight, the number of rising edges having the second level and the number of falling edges having the second level are the same as each other as eight and the first count number and the second count number are the same as each other as 16, the tester 2222 may determine that the operation of the clock generation circuit 221 is normal.

Accordingly, the timing controller 20 may determine the normal operation of the timing controller 20 before an MCP process. The timing controller 20 may check whether an abnormal clock is generated before the package process. Therefore, by not performing a packaging process for an abnormal timing controller which generates an abnormal clock, the packaging cost may be reduced.

Hereinafter, a method for driving a display apparatus in accordance with an embodiment will be described with reference to FIG. 6.

Figure 6:
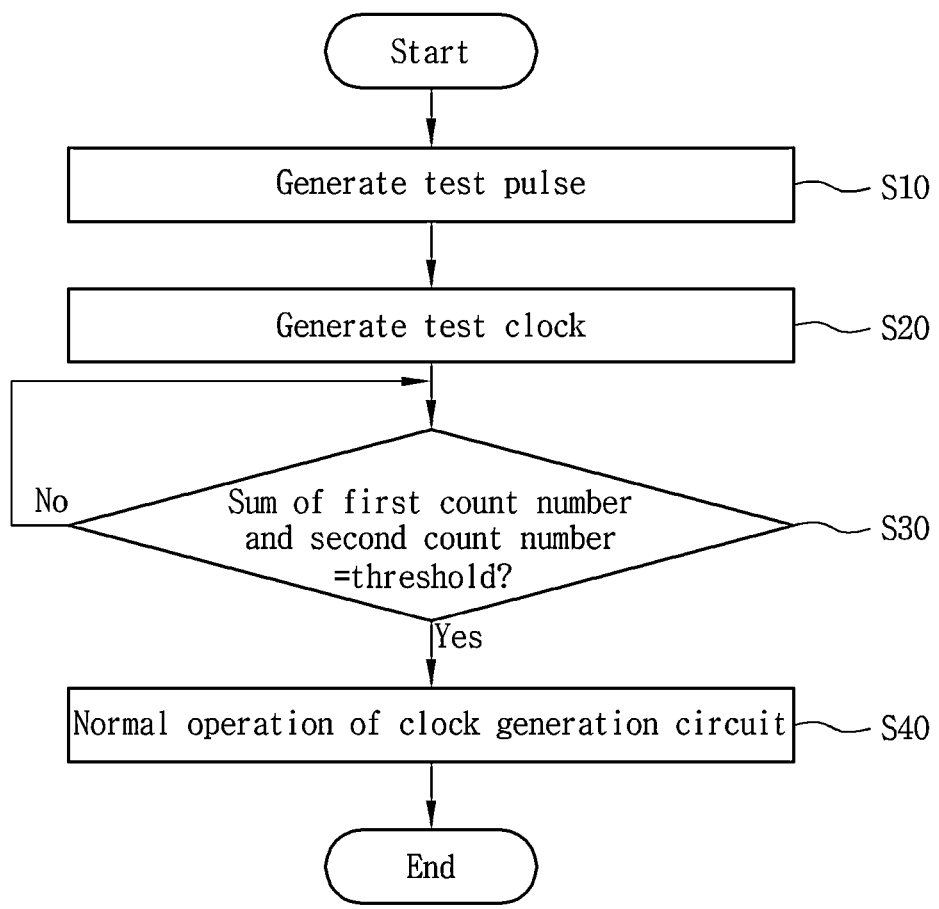
FIG. 6 is a flowchart illustrating a method for driving a display apparatus in accordance with an embodiment.

FIG. 6 is a flowchart illustrating a method for driving a display apparatus in accordance with an embodiment.

At step S10, the timing controller 20 generates the internal clock CLK_I by dividing the clock MCLK by two. The timing controller 20 generates the clock signal CLK using the internal clock CLK_I. The clock generation circuit 221 measures the cycle of the internal clock CLK_I. The timing controller 20 may generate the test pulse TP corresponding to the cycle of the internal clock CLK_I. For example, the timing controller 20 measures the cycle of the internal clock CLK_I between the first time point T1 and the second time point T2, and generates the test pulse TP corresponding to the period between the first time point T1 and the second time point T2.

At step S20, the clock generation circuit 221 of the timing controller 20 may set a portion of the cycle of the internal clock CLK_I as a phase difference. The clock generation circuit 221 generates the 16 test clocks CLK_T by latching the clock signal CLK according to the set phase difference.

For example, the timing controller 20 may measure the cycle of the internal clock CLK_I between the first time point T1 and a second time point T2. The timing controller 20 may set ¹⁄₁₆ of the cycle of the internal clock CLK_I as a phase difference. The clock generation circuit 221 generates the first test clock CLK_T1 to the sixteenth test clock CLK_T16 by latching the clock signal CLK according to the phase difference.

At step S30, the timing controller 20 determines whether the sum of the first count number and the second count number is the same as the threshold.

In detail, the timing controller 20 recognizes a rising edge included in the high level period Pp of the test pulse TP among the first test clock CLK_T1 to the sixteenth test clock CLK_T16, as the first level. The timing controller 20 recognizes a rising edge not included in the high level period Pp among the first test clock CLK_T1 to the sixteenth test clock CLK_T16, as the second level. The timing controller 20 recognizes a falling edge included in the high level period Pp among the first test clock CLK_T1 to the sixteenth test clock CLK_T16, as the first level. The timing controller 20 recognizes a falling edge not included in the high level period Pp among the first test clock CLK_T1 to the sixteenth test clock CLK_T16, as the second level. The timing controller 20 generates the first count number by adding the number of rising edges and the number of falling edges corresponding to the first level. The timing controller 20 generates the second count number by adding the number of rising edges and the number of falling edges corresponding to the second level.

The timing controller 20 determines whether the number of rising edges corresponding to the first level and the number of falling edges corresponding to the first level are the same as each other. The timing controller 20 determines whether the number of rising edges corresponding to the second level and the number of falling edges corresponding to the second level are the same as each other. The timing controller 20 determines whether the first count number and the second count number are the same as each other.

At step S40, when the number of rising edges corresponding to the first level and the number of falling edges corresponding to the first level are the same as each other, the number of rising edges corresponding to the second level and the number of falling edges corresponding to the second level are the same as each other, the first count number and the second count number are the same as each other and the sum of the first count number and the second count number is the same as the preset threshold, the timing controller 20 determines that the operation of the clock generation circuit 221 is normal.

Accordingly, the timing controller 20 may determine the normal operation of the timing controller 20 before the MCP process. The timing controller 20 may check whether an abnormal clock is generated before the package process. Therefore, by not performing a packaging process for an abnormal timing controller which generates an abnormal clock, the packaging cost may be reduced.

For the sake of convenience in explanation, the clock signal CLK and the test clock CLK_T have been described above as separate components. However, the embodiment is not limited thereto, and the clock signal CLK may be the same clock as the test clock CLK_T.

What is claimed is:

1. A timing controller configured to generate a clock signal by using an external first clock,
    wherein the timing controller is configured to:
        generate a second clock by using the first clock, generate a test pulse by using the second clock, and generate a plurality of test clocks by latching the test pulse, and
        determine whether the clock signal is normally generated, by using the number of a plurality of rising edges included in a cycle of the test pulse and the number of a plurality of falling edges included in the cycle of the test pulse, and
        wherein the plurality of rising edges are rising edges of the plurality of test clocks, and the plurality of falling edges are falling edges of the plurality of test clocks.

2. The timing controller according to claim 1, wherein the timing controller is further configured to:
        generate the test pulse so that the test pulse has a high level in correspondence to a cycle of the second clock,
        generate the plurality of test clocks as delay-locked loop clocks by latching the test pulse, and
        the cycle of the second clock is between a first time point and a second time point.

3. The timing controller according to claim 2, wherein the timing controller is further configured to:
        recognize a rising edge included in a high level period of the test pulse among the plurality of rising edges, as a first level, and recognize a rising edge not included in the high level period among the plurality of rising edges, as a second level, and
        recognize a falling edge included in the high level period among the plurality of falling edges, as the first level, and recognize a falling edge not included in the high level period among the plurality of falling edges, as the second level.

4. The timing controller according to claim 3,
    wherein the timing controller is further configured to determine that the clock signal is normally generated when the number of rising edges corresponding to the first level and the number of falling edges corresponding to the first level are the same as each other, the number of rising edges corresponding to the second level and the number of falling edges corresponding to the second level are the same as each other and a first count number and a second count number are the same as each other, and wherein the first count number is a sum of the number of rising edges corresponding to the first level and the number of falling edges corresponding to the first level, and the second count number is a sum of the number of rising edges corresponding to the second level and the number of falling edges corresponding to the second level.

5. The timing controller according to claim 3,
wherein the timing controller is configured to determine that the clock signal is normally generated when the number of rising edges corresponding to the first level and the number of falling edges corresponding to the first level are the same as each other, the number of rising edges corresponding to the second level and the number of falling edges corresponding to the second level are the same as each other and a sum of a first count number and a second count number is the same as a preset threshold, and wherein the first count number is a sum of the number of rising edges corresponding to the first level and the number of falling edges corresponding to the first level, and the second count number is a sum of the number of rising edges corresponding to the second level and the number of falling edges corresponding to the second level.

6. A method for driving a timing controller configured to generate a clock signal by using an external first clock, the method comprising:
generating a second clock by using the first clock, and generating a test pulse by using the second clock;
generating a plurality of test clocks by latching the test pulse; and
determining whether the clock signal is normally generated, by using the number of a plurality of rising edges included in a cycle of the test pulse and the number of a plurality of falling edges included in the cycle of the test pulse,
wherein the plurality of rising edges are rising edges of the plurality of test clocks, and the plurality of falling edges are falling edges of the plurality of test clocks.

7. The method according to claim 6,
wherein the generating of the test pulse comprises:
generating the test pulse so that the test pulse has a high level in correspondence to a cycle of the second clock,
wherein the generating of the plurality of test clocks comprises:
generating the plurality of test clocks as delay-locked loop clocks by latching the test pulse, and
wherein the cycle of the second clock is between a first time point and a second time point.

8. The method according to claim 7, further comprising:
recognizing a rising edge included in a high level period of the test pulse among the plurality of rising edges, as a first level;
recognizing a rising edge not included in the high level period among the plurality of rising edges, as a second level;
recognizing a falling edge included in the high level period among the plurality of falling edges, as the first level; and
recognizing a falling edge not included in the high level period among the plurality of falling edges, as the second level.

9. The method according to claim 8,
wherein the determining of whether the clock signal is normally generated comprises:
when the number of rising edges corresponding to the first level and the number of falling edges corresponding to the first level are the same as each other, the number of rising edges corresponding to the second level and the number of falling edges corresponding to the second level are the same as each other and a first count number and a second count number are the same as each other, determining that the clock signal is normally generated, and wherein the first count number is a sum of the number of rising edges corresponding to the first level and the number of falling edges corresponding to the first level, and the second count number is a sum of the number of rising edges corresponding to the second level and the number of falling edges corresponding to the second level.

10. The method according to claim 8,
wherein the determining of whether the clock signal is normally generated comprises:
when the number of rising edges corresponding to the first level and the number of falling edges corresponding to the first level are the same as each other, the number of rising edges corresponding to the second level and the number of falling edges corresponding to the second level are the same as each other and a sum of a first count number and a second count number is the same as a preset threshold, determining that the clock signal is normally generated, and wherein the first count number is a sum of the number of rising edges corresponding to the first level and the number of falling edges corresponding to the first level, and the second count number is a sum of the number of rising edges corresponding to the second level and the number of falling edges corresponding to the second level.

11. A display apparatus including a timing controller configured to generate a clock signal by using an external first clock,
wherein the timing controller is configured to generate a second clock by using the first clock, generates a test pulse by using the second clock, and generate a plurality of test clocks by latching the test pulse,
wherein the timing controller is configured to determine whether the clock signal is normally generated, by using the number of a plurality of rising edges included in a cycle of the test pulse and the number of a plurality of falling edges included in the cycle of the test pulse, and
wherein the plurality of rising edges are rising edges of the plurality of test clocks, and the plurality of falling edges are falling edges of the plurality of test clocks.

12. The display apparatus according to claim 11, wherein;
the timing controller is configured to generate the test pulse so that the test pulse has a high level in correspondence to a cycle of the second clock, and generate the plurality of test clocks as delay-locked loop clocks by latching the test pulse, and
the cycle of the second clock is between a first time point and a second time point.

13. The display apparatus according to claim 12, wherein;
the timing controller is configured to recognize a rising edge included in a high level period of the test pulse among the plurality of rising edges, as a first level, and recognizes a rising edge not included in the high level period among the plurality of rising edges, as a second level, and
the timing controller is configured to recognize a falling edge included in the high level period among the plurality of falling edges, as the first level, and recognizes a falling edge not included in the high level period among the plurality of falling edges, as the second level.

14. The display apparatus according to claim 13, wherein:
when the number of rising edges corresponding to the first level and the number of falling edges corresponding to the first level are the same as each other, the number of rising edges corresponding to the second level and the number of falling edges corresponding to the second level are the same as each other and a first count number and a second count number are the same as each other, the timing controller is configured to determine that the clock signal is normally generated, and
the first count number is a sum of the number of rising edges corresponding to the first level and the number of falling edges corresponding to the first level, and the second count number is a sum of the number of rising edges corresponding to the second level and the number of falling edges corresponding to the second level.

15. The display apparatus according to claim 13, wherein
when the number of rising edges corresponding to the first level and the number of falling edges corresponding to the first level are the same as each other, the number of rising edges corresponding to the second level and the number of falling edges corresponding to the second level are the same as each other and a sum of a first count number and a second count number is the same as a preset threshold, the timing controller is configured to determine that the clock signal is normally generated, and
the first count number is a sum of the number of rising edges corresponding to the first level and the number of falling edges corresponding to the first level, and the second count number is a sum of the number of rising edges corresponding to the second level and the number of falling edges corresponding to the second level.

16. A timing controller configured to generate a clock signal,
wherein the timing controller is configured to generate a test pulse by using an external clock, and generate a test clock by using the test pulse,
wherein the timing controller is configured to determine whether the clock signal is normally generated, by using a cycle of the test pulse and an edge of the test clock,
the timing controller is configured to generate the test clock as a delay-locked loop clock by latching the test pulse, and is configured to determine whether the clock signal is normally generated, by using the number of rising edges and the number of falling edges included in the cycle of the test pulse, and
the rising edge is a rising edge of the test clock, and the falling edge is a falling edge of the test clock.

17. The timing controller according to claim 16, wherein:
the timing controller is configured to generate an internal clock by using the external clock, and generate the test pulse so that the test pulse has a high level in correspondence to a cycle of the internal clock, and
the cycle of the internal clock is between a first time point and a second time point.

18. The timing controller according to claim 17, wherein the timing controller is configured to sample the rising edge and the falling edge included in a high level period of the test pulse, as a first level, and sample the rising edge and the falling edge not included in the high level period, as a second level.

19. The timing controller according to claim 18, wherein the timing controller is configured to determine that the clock signal is normally generated, when the numbers of rising edges and falling edges corresponding to the first level and the numbers of rising edges and falling edges corresponding to the second level are the same as each other.

* * * * *